US012774414B2

(12) United States Patent
Lee et al.

(10) Patent No.: US 12,774,414 B2
(45) Date of Patent: Oct. 27, 2026

(54) METHOD OF PREPARING PHOSPHORUS-CONTAINING FLAME RETARDANTS AND THEIR USE IN POLYMER COMPOSITIONS

(71) Applicant: LANXESS Corporation, Pittsburgh, PA (US)

(72) Inventors: Julia Yue Lee, Naugatuck, CT (US); Simon J. Bonyhady, Waterbury, CT (US); Qingliang He, Cheshire, CT (US); Ramesh Sharma, Cheshire, CT (US)

(73) Assignee: LANXESS Corporation, Pittsburgh, PA (US)

( * ) Notice: Subject to any disclaimer, the term of this patent is extended or adjusted under 35 U.S.C. 154(b) by 1196 days.

(21) Appl. No.: 17/768,877

(22) PCT Filed: Dec. 18, 2019

(86) PCT No.: PCT/US2019/067230

§ 371 (c)(1),
(2) Date: Apr. 14, 2022

(87) PCT Pub. No.: WO2021/076169

PCT Pub. Date: Apr. 22, 2021

(65) Prior Publication Data

US 2024/0117252 A1 Apr. 11, 2024

Related U.S. Application Data

(60) Provisional application No. 62/923,444, filed on Oct. 18, 2019.

(51) Int. Cl.

| | |
|---|---|
| ***C09K 21/12*** | (2006.01) |
| ***C07F 9/38*** | (2006.01) |
| ***C08K 3/105*** | (2018.01) |
| ***C08K 3/16*** | (2006.01) |
| ***C08K 3/22*** | (2006.01) |
| ***C08K 3/26*** | (2006.01) |
| ***C08K 5/5333*** | (2006.01) |

(52) U.S. Cl.

CPC ............ *C09K 21/12* (2013.01); *C07F 9/3808* (2013.01); *C08K 3/105* (2018.01); *C08K 3/16* (2013.01); *C08K 3/22* (2013.01); *C08K 3/26* (2013.01); *C08K 5/5333* (2013.01); *C08K 2003/2265* (2013.01)

(58) Field of Classification Search

None

See application file for complete search history.

(56) References Cited

U.S. PATENT DOCUMENTS

| | | | | |
|---|---|---|---|---|
| 4,972,011 | A * | 11/1990 | Richardson | C07F 9/4075 524/130 |
| 5,053,148 | A | 10/1991 | von Bonin | |
| 5,102,932 | A | 4/1992 | Gainer | |
| 9,745,449 | B2 | 8/2017 | Stockdale et al. | |
| 9,752,011 | B2 | 9/2017 | Stockdale et al. | |
| 9,765,204 | B2 | 9/2017 | Timberlake et al. | |
| 9,994,696 | B2 | 6/2018 | Timberlake et al. | |
| 11,993,622 | B2 | 5/2024 | Bonyhady et al. | |
| 12,152,129 | B2 | 11/2024 | Lee et al. | |
| 2005/0001487 | A1 | 1/2005 | Knop et al. | |
| 2007/0029532 | A1 | 2/2007 | Hansel et al. | |
| 2016/0032076 | A1 | 2/2016 | Stockdale et al. | |
| 2016/0281001 | A1 | 9/2016 | Butz | |
| 2019/0022577 | A9 | 1/2019 | Cox et al. | |
| 2023/0323658 | A1 | 10/2023 | Hughes et al. | |
| 2024/0117252 | A1 | 4/2024 | Lee et al. | |

FOREIGN PATENT DOCUMENTS

| | | | |
|---|---|---|---|
| EP | 2479181 | A1 | 7/2012 |

OTHER PUBLICATIONS

International Search Report from corresponding International Application No. PCT/US2019/067230, dated Aug. 31, 2020, four pages.
Written Opinion of the International Searching Authority for corresponding International Application No. PCT/US2019/067230, dated Aug. 31, 2020, 13 pages.

* cited by examiner

*Primary Examiner* — Tanisha Diggs
(74) *Attorney, Agent, or Firm* — Nicanor A. Kohncke; Christopher L. McDavid; Alyson J. DiLena

(57) ABSTRACT

A phosphorus-containing flame retardant is produced by preparing a reaction mixture, the reaction mixture including a phosphonic acid, a solvent for the phosphonic acid, and a metal or suitable metal compound, and reacting the phosphonic acid and the metal or suitable metal compound under conditions as described herein. The chemical composition of the resulting flame retardant product leads to excellent flame retardancy and exhibits high thermal stability. The presently disclosed flame retardants are useful, for example, in polymer compositions, particularly thermoplastics processed at high temperatures, over a wide range of applications.

17 Claims, 1 Drawing Sheet

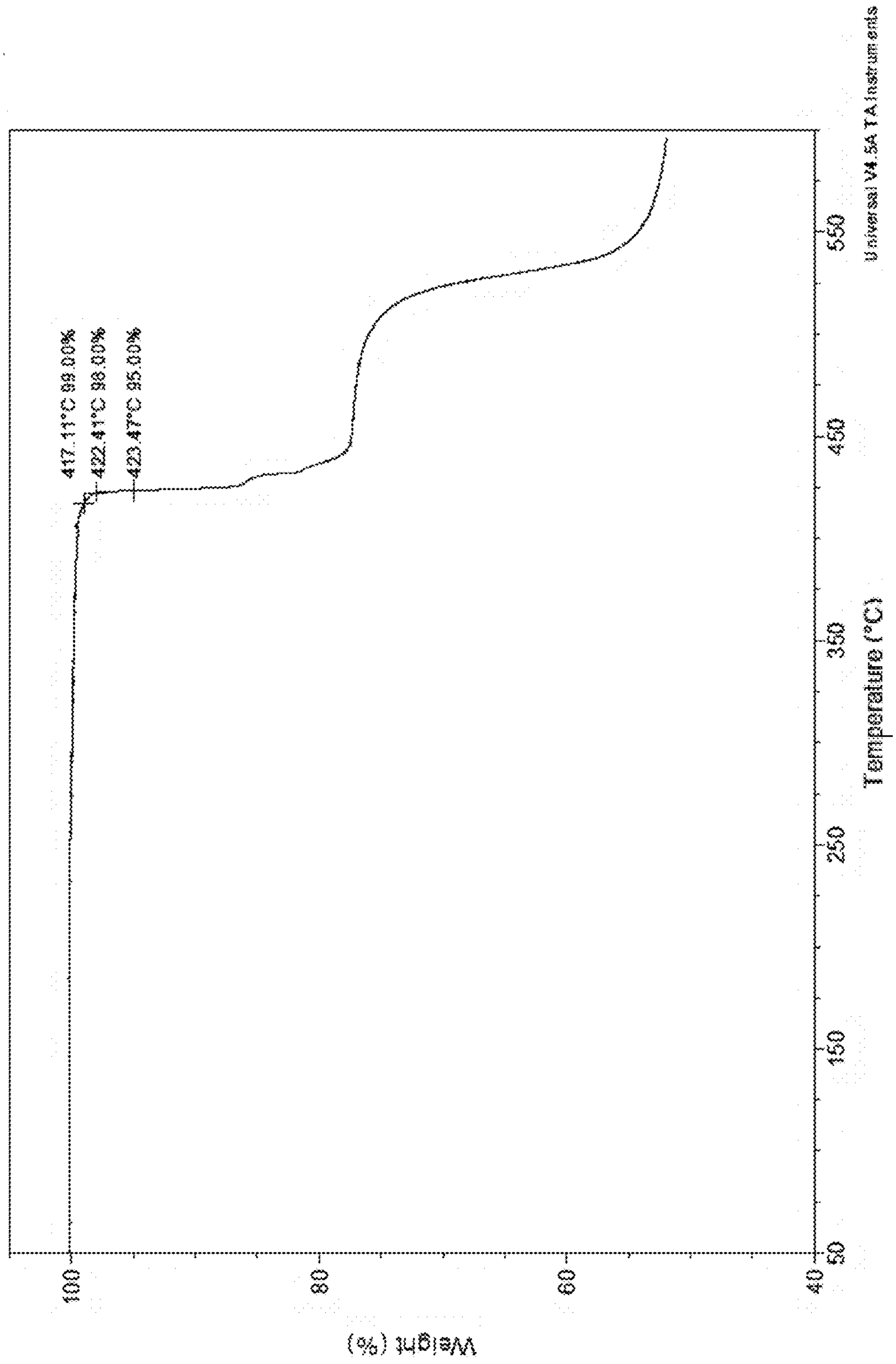
417.11°C 99.00%
422.41°C 98.00%
423.47°C 95.00%
Weight (%)
100
80
60
40
Temperature (°C)
50
150
250
350
450
550
Universal V4.5A TA Instruments

METHOD OF PREPARING PHOSPHORUS-CONTAINING FLAME RETARDANTS AND THEIR USE IN POLYMER COMPOSITIONS

This application claims priority benefit to U.S. Provisional Application No. 62/923,444, filed Oct. 18, 2019, which is incorporated herein by reference in its entirety.

A highly effective, thermally-stable, phosphorus-containing flame retardant is produced by a process comprising preparing a reaction mixture, the reaction mixture comprising a phosphonic or pyrophosphonic acid, a solvent for the phosphonic or pyrophosphonic acid, and a metal or suitable metal compound, and reacting the phosphonic or pyrophosphonic acid and the metal or suitable metal compound under conditions as described herein. The chemical composition of the resulting flame retardant product, in many embodiments produced as one or predominantly one compound, leads to excellent flame retardancy and exhibits high thermal stability. The presently disclosed flame retardants are useful, for example, in polymer compositions, particularly thermoplastics processed at high temperatures, over a wide range of applications.

BACKGROUND

Phosphonic acid salts, i.e., compounds of the formula directly below, are known flame retardants in many polymer compositions:

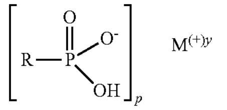

wherein R is an optionally substituted alkyl, aryl, alkylaryl or arylalkyl group, p is typically a number of from 1 to 4, M is a metal, and y is typically a number of from 1 to 4, so that $M^{(+)y}$ is a metal cation where (+)y represents the charge formally assigned to the cation.

As disclosed in US 2007/0029532, decomposition of phosphonic acid salts is known at temperatures encountered during processing of polyesters and polyamides, damaging the polymers in the process, e.g., temperatures above 260 or 270° C.

U.S. Pat. No. 5,053,148 discloses that brittle, heat resistant foams can be obtained by heating phosphonic acid salts at elevated temperatures.

In Comparative Examples 1 and 2 of U.S. Pat. No. 9,745,449, glass filled polyamide compositions comprising 10 to 25 wt % of methylphosphonic acid aluminum salt were processed at elevated temperatures. A decrease in torque was observed during compounding, consistent with polymer degradation, producing a final product material that was friable upon cooling, dusty after grinding, and which could not be molded. Analysis of the compounded material by gel permeation chromatography (GPC) and differential scanning calorimetry (DSC) provided additional evidence of degradation. The loss of desired polymer properties observed is consistent with the degradation of polymers suggested in US 2007/0029532 and the brittle foam formed in U.S. Pat. No. 5,053,148.

Thus, simple phosphonic acid salts are not suitable for use in many polymers that are processed at, or subsequently exposed to, high temperatures, such as 250° C., 260° C., 270° C. or higher, as they undergo chemical transformation at such temperatures via processes that harm the polymer. This may happen during compounding, e.g., in an extruder, or while the salt is present in a polymer in a high temperature application.

On the other hand, U.S. Pat. No. 9,745,449 discloses that heating a phosphonic acid salt at high enough temperatures generally in the absence of other materials thermally transforms the salt into a different, more thermally stable material exhibiting excellent flame retardant activity when incorporated into polymeric substrates. The thermally transformed materials do not degrade at high temperatures, nor do they cause degradation of a polymer, when processed in polymer compositions at elevated temperatures, e.g., 240° C., 250° C., 260° C., 270° C. or higher, which is an important advantage over previously known phosphonate salts, which exhibit flame retardant activity but often degrade the polymer during processing. The thermally transformed materials are described as comprising one or more compounds represented by empirical formula (IV):

(IV)

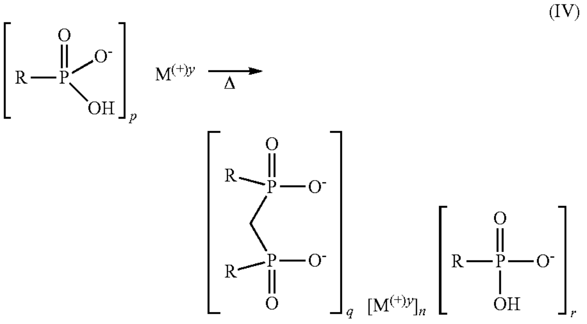

wherein R is alkyl or aryl, M is a metal, q is a number of from 1 to 7, e.g., 1, 2 or 3, r is a number from 0 to 5, e.g., 0, 1 or 2, y is a number of from 1 to 7, e.g., from 1 to 4, and n is 1 or 2, provided that 2(q)+r=n(y).

Challenges, however, are encountered with the process and materials of U.S. Pat. No. 9,745,449, such as the production of product generally in the form of a solid mass requiring grinding, milling, or other such physical processing before use; formation of product mixtures containing water soluble or thermally unstable compounds; and difficulty in controlling the phosphorus to metal ratio of the resulting product. In addition, the Examples of U.S. Pat. No. 9,745,449 describe producing a phosphorus-containing flame retardant in several steps wherein an intermediate metal salt of a phosphonic acid is produced and the dried salt is then heated at temperatures over 200° C.

The present disclosure addresses the above-identified challenges, while also producing a phosphorus-containing flame retardant without requiring the production or use of the intermediate salt as described in U.S. Pat. No. 9,745,449.

SUMMARY

In accordance with the present disclosure, a phosphorus-containing flame retardant is prepared by a process comprising (i) preparing a reaction mixture, the reaction mixture comprising (a) an unsubstituted or alkyl or aryl substituted phosphonic acid, (b) a solvent for the phosphonic acid, and (c) a metal which is capable of forming a polycation (i.e., a metal represented in its corresponding cationic form by the formula $M^{(+)y}$ where M is a metal, (+)y represents the charge of the metal cation, and y is 2 or higher), or a suitable metal compound which is represented by the formula $$M_p^{(+)y}$$

$X_q$ where M is a metal, (+)y represents the charge of the metal cation, y is 2 or higher, X is an anion, and the values for p and q provide a charge balanced metal compound; and (ii) heating or reacting the reaction mixture at a reaction temperature of 105° C. or higher for an amount of time sufficient to produce the phosphorus-containing flame retardant.

Also disclosed is a process of producing a phosphorus-containing flame retardant, comprising (i) preparing a reaction mixture, the reaction mixture comprising (a) an unsubstituted or alkyl or aryl substituted pyrophosphonic acid, (b) a solvent for the pyrophosphonic acid, and (c) a metal which is capable of forming a polycation (i.e., a metal represented in its corresponding cationic form by the formula $M^{(+)y}$ as above), or a suitable metal compound which is represented by the formula $$M_p^{(+)y}$$

$X_q$ as above, and (ii) heating or reacting the reaction mixture at a reaction temperature of 20° C. or higher for an amount of time sufficient to produce the phosphorus-containing flame retardant.

Often, the reaction product forms as a slurry as the resulting flame retardant product of the present invention precipitates from the reaction mixture. Phosphonic acid, pyrophosphonic acid, and/or solvent remaining after the reaction can be removed along with any possible byproducts by filtration and/or washing, e.g., with water. In many embodiments, a substantially pure flame retardant material is produced, e.g., a flame retardant comprising essentially a single compound with flame retardant activity or essentially a mixture of active compounds. Conversion based on the metal or metal compound is typically high, and the product can be readily isolated and optionally further purified if desired.

The present process overcomes difficulties observed in processes such as found in U.S. Pat. No. 9,745,449, because, e.g., production of water soluble or thermally unstable compounds are reduced or avoided, and the flame retardant product, which typically crystallizes as a powder or small particles, can be produced directly in a readily processable form, i.e., without requiring or necessitating grinding, granulating, or other such physical processing. Further, in many embodiments, the resulting flame retardant material produced according to the present disclosure has a higher phosphorus to metal ratio than seen with simple metal phosphonates, as further explained herein. High phosphorus to metal ratios in the produced flame retardant leads to greater efficiency and can therefore permit lower loading levels when the flame retardant material is compounded into thermoplastics.

Other embodiments of the present disclosure include, but are not limited to, a phosphorus-containing flame retardant produced according to a process described herein; a flame retardant polymer composition comprising (i) a polymer and (ii) a phosphorus-containing flame retardant of the present disclosure; a process for improving the flame retardancy of a polymer by incorporating therein a flame retardant of the present disclosure; and a process for incorporating into a polymer a flame retardant composition comprising a flame retardant of the present disclosure.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE FIGURES

FIG. 1 shows the result of thermogravimetric analysis (TGA) of an exemplary flame retardant material produced according to Example 1 of the present disclosure.

DETAILED DESCRIPTION

Unless otherwise specified, the word "a" or "an" in this application means "one or more than one".

The term "alkyl" in this application includes "arylalkyl," unless the context dictates otherwise.

The term "aryl" in this application includes "alkylaryl," unless the context dictates otherwise.

The term "phosphonic acid" as used herein refers to unsubstituted or alkyl or aryl substituted phosphonic acid, unless the context dictates otherwise.

The term "pyrophosphonic acid" as used herein refers to unsubstituted or alkyl or aryl substituted pyrophosphonic acid, unless the context dictates otherwise.

According to one aspect of the present disclosure, a metal or suitable metal compound and an unsubstituted or alkyl or aryl substituted phosphonic acid are reacted to form a phosphorus-containing flame retardant. The process includes (i) preparing a reaction mixture, the reaction mixture comprising (a) an unsubstituted or alkyl or aryl substituted phosphonic acid, (b) a solvent for the phosphonic acid, and (c) a metal or suitable metal compound; and (ii) heating or reacting the reaction mixture at a reaction temperature of 105° C. or higher for an amount of time sufficient to produce a phosphorus-containing flame retardant. In the reaction, the metal is oxidized and may be represented in its corresponding cationic form by the formula $M^{(+)y}$ where M is a metal, (+)y represents the charge of the metal cation, and y is 2 or higher. The suitable metal compound may be represented by the formula $$M_p^{(+)y}$$

$X_q$, where M is a metal, (+)y represents the charge of the metal cation, y is 2 or higher, X is an anion, and the values for p and q provide a charge balanced metal compound.

In another aspect, a metal or suitable metal compound and an unsubstituted or alkyl or aryl substituted pyrophosphonic acid are reacted to form a phosphorus-containing flame retardant. The process includes (i) preparing a reaction mixture, the reaction mixture comprising (a) an unsubstituted or alkyl or aryl substituted pyrophosphonic acid, (b) a solvent for the pyrophosphonic acid, and (c) a metal or suitable metal compound as above; and (ii) heating or reacting the reaction mixture at a reaction temperature of 20° C. or higher for an amount of time sufficient to produce a phosphorus-containing flame retardant.

In many embodiments, the molar ratio of the phosphonic or pyrophosphonic acid to the metal or suitable metal compound in the reaction mixture is higher than 2:1, such as about 3:1 or higher, about 4:1 or higher, about 5:1 or higher, about 6:1 or higher, about 7:1 or higher, or about 8:1 or higher. Often larger molar excesses of the phosphonic or pyrophosphonic acid to the metal or suitable metal compound are used in the reaction mixture, such as about 10:1 or higher, about 15:1 or higher, about 20:1 or higher, about 25:1 or higher, about 30:1 or higher, or any range therebetween. A large molar excess of the phosphonic or pyrophosphonic acid relative to the metal or suitable metal compound may be used. For example, the molar ratio may be up to about 50:1, up to about 100:1, up to about 300:1, up to about 500:1, or any range therebetween. However, as would be understood, process efficiency may suffer at certain large molar excesses, e.g., product precipitation from the reaction mixture may be hindered. In many embodiments, the molar ratio ranges from about 4:1, from about 5:1, from about 6:1, from about 8:1 or from about 10:1 to about 100:1 or to about 50:1, such as from about 8:1, from about 12:1, from about 16:1 or from about 20:1 to about 50:1 or to about 40:1.

According to the presently disclosed process, the reaction mixture is heated at a reaction temperature as described herein for an amount of time sufficient to produce the flame retardant product. As used herein, the step of "heating the reaction mixture at a reaction temperature for an amount of time sufficient to produce the phosphorus-containing flame retardant" and the like include, but are not limited to, embodiments where all or substantially all of component (b) of the reaction mixture—i.e., the solvent for the phosphonic or pyrophosphonic acid—boils off from the reaction mixture during the course of heating the reaction mixture to or at the reaction temperature. It is therefore understood that the "reaction mixture" described herein is still said to be heated at the reaction temperature even where all or substantially all of the solvent component (b) boils off during the course of heating the reaction mixture to or at the reaction temperature.

The reaction temperature for producing a phosphorus-containing flame retardant according to the present disclosure should be chosen to facilitate the formation of mono-anionic and/or dianionic pyrophosphonic acid ligands in the reaction product. For a phosphonic acid, a reaction temperature of 105° C. or higher is used. Without being bound by a particular theory, the reaction temperature is chosen to produce pyrophosphonic acid ligands via dehydration reaction(s). In many embodiments, the metal or suitable metal compound and the phosphonic acid are reacted at temperatures higher than 105° C., such as about 115° C. or higher, about 120° C. or higher, about 130° C. or higher, about 140° C. or higher, about 150° C. or higher, about 160° C. or higher, about 170° C. or higher, about 180° C. or higher, about 200° C. or higher, about 220° C. or higher, about 240° C. or higher, about 260° C. or higher, about 280° C. or higher, or any range therebetween. The reaction temperature may be higher than those described above, such as up to about 350° C., up to about 400° C., or higher, but it typically does not meet or exceed the boiling temperature of the phosphonic acid. In many embodiments, the reaction temperature ranges from about 110° C. to about 350° C., from about 115° C. to about 300° C., from about 125° C. to about 280° C., or from about 140° C. to about 260° C. Through the dehydration reaction(s), water is formed, which can potentially lead to the undesirable reverse (hydrolysis) reaction. Thus, in some embodiments, the reaction system is designed to facilitate removal, such as the continuous removal, of water from the reaction mixture. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

For a pyrophosphonic acid, a reaction temperature of 20° C. or higher is used. As dehydration is unnecessary for pyrophosphonic acid, the reaction temperature can be lower than that described above for phosphonic acid. In many embodiments, the metal or suitable metal compound and the pyrophosphonic acid are reacted at temperatures higher than 20° C., such as about 40° C. or higher, about 60° C. or higher, about 80° C. or higher, about 100° C. or higher, about 140° C. or higher, about 180° C. or higher, about 200° C. or higher, or any range therebetween. The reaction temperature may be higher than those described above, such as up to about 300° C., up to about 400° C., or higher, but it typically does not meet or exceed the boiling temperature of the pyrophosphonic acid. In many embodiments, the reaction temperature ranges from about 25° C. to about 350° C., from about 25° C. to about 280° C., from about 30° C. to about 260° C., from about 40° C. to about 260° C., or from about 60° C. to about 240° C. Depending, for example, on the metal compound used to react with the pyrophosphonic acid, water may be generated from the reaction. As described above, in some embodiments, the reaction system is designed to facilitate removal, such as the continuous removal, of water from the reaction. For example, the reaction temperature may be chosen above the boiling temperature of the water to the extent necessary to boil off at least a portion or desired amount (e.g., a majority, substantially all, or all) of the water from the reaction. Additional means, such as a gas purge, vacuum, and/or other known means, may be used to facilitate removal of water from the reaction system.

In some embodiments, the solvent is a protic solvent (e.g., water) and the reaction system is designed to facilitate removal, such as the continuous removal, of the protic solvent during heating of the reaction mixture. For example, the reaction temperature may be chosen at or higher than the boiling temperature of the protic solvent to the extent necessary to boil off at least a portion or desired amount (e.g., a majority, substantially all, or all) of the protic solvent during heating of the reaction mixture In certain embodiments, the solvent is water and the reaction temperature is about 110° C. or higher, about 115° C. or higher, about 120° C. or higher, about 130° C. or higher, about 140° C. or higher, about 150° C. or higher, or about 160° C. or higher, such as the exemplary ranges described above. The reaction temperature may also be chosen at or higher than the melting temperature of the phosphonic or pyrophosphonic acid, such as further described herein.

As described above, the reaction mixture is heated or reacted at the reaction temperature for an amount of time sufficient to produce the phosphorus-containing flame retardant. Often, the flame retardant product will precipitate from the reaction mixture such that the reaction is run for a time sufficient to achieve such precipitation. In general, the amount of time required to achieve at least substantial conversion to the flame retardant product, based on the metal or suitable metal compound in the reaction mixture, will depend on the reaction temperature, with higher temperatures generally resulting in shorter reaction times. Often, heating or reacting occurs at the reaction temperature for from about 0.1 to about 48 hours, such as from about 0.2 to about 36 hours, from about 0.5 to about 30 hours, from about 1 hour to about 24 hours, e.g., from about 1 hour to about 12 hours, from about 1 hour to about 8 hours, or from about 1 hour to about 5 hours, although other durations may be used.

The reaction mixture can be prepared in any manner suitable for combining or mixing (a) the unsubstituted or alkyl or aryl substituted phosphonic or pyrophosphonic acid, (b) the solvent for the phosphonic or pyrophosphonic acid, and (c) the metal or suitable metal compound. For example, the components may be combined simultaneously or at different times. In some embodiments, the metal or suitable metal compound (c) is added to a mixture, such as a solution, of the phosphonic or pyrophosphonic acid (a) and solvent (b). The metal or suitable metal compound (c) can be added to the reaction mixture all at once or in portions. Similarly, the phosphonic or pyrophosphonic acid (a), solvent (b), or mixture, such as a solution, of the phosphonic or pyrophosphonic acid (a) and solvent (b), can be added to the reaction mixture all at once or in portions.

In preparing the reaction mixture, the phosphonic or pyrophosphonic acid (a), the solvent (b), and the metal or suitable metal compound (c) may be combined at a preparation temperature below the reaction temperature. The reaction mixture is subsequently heated to the reaction temperature. A preparation temperature may be chosen, for example, to facilitate dissolution of the phosphonic or pyrophosphonic acid (a) in the solvent (b) or to otherwise form a homogenous liquid or solution of the phosphonic or pyrophosphonic acid (a) and the solvent (b). At the preparation temperature, and depending on the metal compound (c), the reaction mixture may form a solution, suspension or slurry, such as a homogenous or substantially homogenous suspension or slurry. In some embodiments, such as at higher preparation temperatures, the reaction mixture may form a solution. Often, near or at the reaction temperature the reaction mixture will present as a solution. In many embodiments, the preparation temperature is about 0° C. or higher, but often below 150° C., such as below 125° C., below 115° C., below 100° C., below 85° C., or below 65° C. For example, the preparation temperature may range from about 0° C. to about 65° C. or from about 15° C. to about 40° C. In some embodiments, the reaction mixture is prepared at room temperature (e.g., from about 15° C. to about 25° C.). In some embodiments, the solvent (b) is preheated to the preparation temperature and combined with the phosphonic or pyrophosphonic acid (a) and the metal or suitable metal compound (c). In some embodiments, a mixture of the solvent (b) and the phosphonic or pyrophosphonic acid (a) is preheated to the preparation temperature and is combined with the metal or suitable metal compound (c).

The reaction mixture may alternatively be prepared at the reaction temperature. That is, the reaction mixture is prepared by combining (a) the phosphonic or pyrophosphonic acid, (b) the solvent for the phosphonic or pyrophosphonic acid, and (c) the metal or suitable metal compound at the reaction temperature. For example, in some embodiments, preparing the reaction mixture comprises preheating a mixture of the solvent (b) and the phosphonic or pyrophosphonic acid (a) to the reaction temperature and combining with the metal or suitable metal compound (c).

In some embodiments where the reaction temperature is higher than the melting temperature of the phosphonic or pyrophosphonic acid and residual phosphonic or pyrophosphonic acid is present in the product reaction mixture after desired conversion, e.g., full or substantially full conversion, to the flame retardant product is achieved, the product reaction mixture is cooled to a temperature above or no less than the melting temperature of the residual phosphonic or pyrophosphonic acid to ensure that the phosphonic or pyrophosphonic acid remains in liquid form. This may be particularly useful in embodiments where an appreciable amount of the solvent for the phosphonic or pyrophosphonic acid (i.e., component (b)) boils off as a result of the heating such that remaining excess phosphonic or pyrophosphonic acid may have a greater tendency to come out of solution. The excess phosphonic or pyrophosphonic acid and the solvent if present in the product reaction mixture can be removed by filtration/washing and optionally recovered. The recovered excess phosphonic or pyrophosphonic acid and/or solvent may be recycled, e.g., back into the reactor in which a metal or suitable metal compound (c) reacts with the phosphonic or pyrophosphonic acid (a). After conversion to the reaction product, a solvent for the phosphonic or pyrophosphonic acid, which may but need not be the same as the solvent component (b), may optionally be added to dissolve or otherwise help remove excess phosphonic or pyrophosphonic acid. The flame retardant product is often isolated by filtration, optionally followed by additional work up (e.g., washing, drying, sieving, etc.). The resulting flame retardant product, which is generally in the form of a powder or small particles, is readily processable, i.e., without requiring or necessitating grinding, milling, or other such physical processing before use. It should be understood that producing the flame retardant material "directly" as a powder or small particles in accordance with the presently disclosed process permits workup of the reaction product, such as isolating the flame retardant product (e.g., separating the flame retardant product from remaining solvent), which may include, e.g., processing the reaction product by filtering, sieving, washing, drying, and the like.

The process of the present disclosure yields a flame retardant comprising one or more metals and one or more mono- and/or bi-dentate pyrophosphonic acid ligands. In some embodiments, compounds that additionally comprise phosphonate ligands may be produced, but in all embodiments compounds comprising a pyrophosphonic acid monoanionic ligand and/or a pyrophosphonic acid di-anionic ligand are obtained.

The process may yield mixtures of flame retardant compounds, but in many embodiments the process produces a flame retardant material as one, or predominantly one, compound, with high conversion based on the metal or metal compound, such as at least 70%, 80%, 85%, 90%, 95%, 98% or higher conversion, or any range therebetween, as opposed to the mixtures of compounds that are obtained with the prior art processes involving heat treatment of metal phosphonate salts. In a general embodiment, in which phosphonate ligands may be present in the flame retardant product, the reaction proceeds generally as shown:

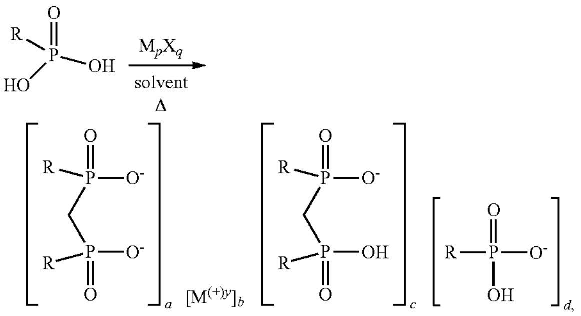

wherein M is a metal cation and (+)y represents the charge of the cation, e.g., M is a di, tri, tetra, penta-cationic metal; X is an anionic ligand or ligands attached to the metal and the stoichiometry of M and X (i.e., p and q) provides a charged balanced metal compound; R is H, an alkyl, aryl, alkylaryl or arylalkyl; a, b, c and d represent the ratio of the components to which they correspond relative to one another in the reaction product, and y, a, b, c and d are values that provide a charged balanced product, with the proviso that y is 2 or more and only one of a or c can be 0 (often, c is not zero). In some embodiments, the phosphonic acid ligand above with the coefficient d, when present, may be present as a dianion. In many embodiments, d is 0.

In a further aspect, a flame retardant product produced according to the present disclosure, typically in the form of a powder or small particles, comprises a compound or mixture of different compounds of empirical formula (II)

(II)

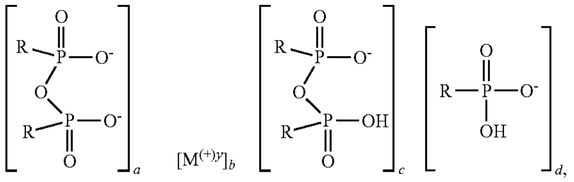

wherein R is H, an alkyl, aryl, alkylaryl or arylalkyl group, a, b, c and d represent the ratio of the components to which they correspond relative to one another in the compound, and a is generally a number of from 0 to 8, e.g., from 0 to 6, from 0 to 4, or from 0 to 2, c is generally a number of from 0 to 10, e.g., from 0 to 8, from 0 to 6, from 0 to 4 or from 0 to 2, d is generally a number of from 0 to 6, e.g., 0 to 4 or 0 to 2, M is a metal, y is a number of from 2 to 5, such as 2, 3 or 4, often 2 or 3, and $M^{(+)y}$ is a metal cation where (+)y represents the charge formally assigned to the cation. The values of a, b, c, d and y may vary, but will satisfy the charge-balance equation 2(a)+c+d=b(y), and only one of a or c can be 0. In many embodiments, c is not zero. In instances where a di-anionic phosphonic acid ligand may be present in the compound, the charge balance equation becomes 2(a)+c+2(d)=b(y). The value for b is limited only in that it must satisfy the preceding equations, but in many embodiments b is a number of from 1 to 4, e.g., 1 or 2. In some embodiments, a is 0, 1, or 2 (e.g., 0 or 1), c is 1 or 2, and d is 0, 1, or 2 (e.g., 0 or 1), and the product is charged balanced.

In many embodiments, d is 0, as in:

(III)

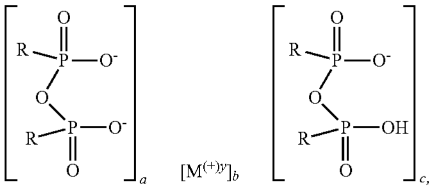

where R, M, y, a, b, and c are as described above and the product charge balance equation becomes 2(a)+c=b(y).

Often, c in the formulas (II) and (III) above is not zero (e.g., c is from 1 to 10, from 1 to 8, from 1 to 6, from 1 to 4, or 1 or 2).

In accordance with the presently disclosed process, it was surprisingly discovered in many embodiments, such as when employing di-cationic or tri-cationic metals, that a flame retardant compound is produced where c in the formulas above is not zero and the product has a more favorable ratio of phosphorus atoms to metal atoms (i.e., P to M) for providing flame retardancy as compared to phosphorus-containing flame retardants described in the art. For example, tri-cationic metals (e.g., aluminum) and di-cationic metals (e.g., zinc) are known to form tri-substituted and di-substituted charge balanced compounds, respectively. As seen in the art, tris-phosphonate aluminum salts—having a phosphorus to aluminum ratio of 3:1—and di-phosphonate zinc salts—having a phosphorus to zinc ratio of 2:1—are known as flame retardants. However, in accordance with the pyrophosphonic acid ligand formation of the present disclosure, and particularly where c in the formulas above is not zero, the ratio of phosphorus to metal in the flame retardant product is higher. For example, as demonstrated in the Examples disclosed herein, when employing the process of the present disclosure the ratio of phosphorus to aluminum, or the ratio of phosphorus to iron, in the resulting flame retardant product was 4:1. Such a higher phosphorus to metal ratio leads to high efficiency and can allow for reduced loadings when compounded into thermoplastic polymers.

In certain specific embodiments, y in formula (III) is 2 (i.e., $M^{(+)y}$ is a di-cationic metal, such as described herein), a is 0, b is 1, and c is 2. In certain embodiments, the di-cationic metal M is Mg, Ca, or Zn. In other embodiments, y in formula (III) is 3 (i.e., $M^{(+)y}$ is a tri-cationic metal, such as described herein), a is 1, b is 1, and c is 1. In certain embodiments, the tri-cationic metal M is chosen from Al, Ga, Sb, Fe, Co, B, and Bi. In certain embodiments, the tri-cationic metal M is Al, Fe, Ga, Sb, or B.

As is common with inorganic coordination compounds, the reaction product in the above described reaction and the compounds of empirical formulas (II) and (III) are idealized such that the reaction product or compounds may be coordination polymers, complex salts, salts where certain atomic valences are shared, etc.

For example, in many embodiments, empirical formula (II) or (III), as described herein, represents a monomer unit (i.e., coordination entity) of a coordination polymer, the extended coordination polymer structure thereby forming the flame retardant compound of the present disclosure.

In one example, where M is Al and y is 3, a compound of empirical formula (III) is produced according to the following empirical formula (IIIa):

(IIIa)

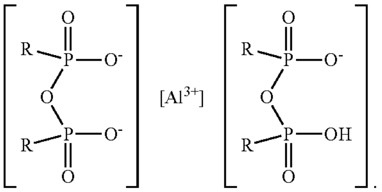

As shown herein, the absence of subscripts a, b and c in empirical formulas indicates that the subscripts are each 1, signifying a 1:1:1 ratio of the components (which, in the case of empirical formula (IIIa), a 1:1:1 ratio of di-anionic pyrophosphonic acid ligand, metal atom, and mono-anionic pyrophosphonic acid ligand). In this example, empirical formula (IIIa) represents a repeating monomer unit (i.e., coordination entity) of a coordination polymer, the extended coordination polymer structure thereby forming the flame retardant compound of the present disclosure.

Often, a compound of empirical formula (II) or (III) (e.g., (IIIa)), which in many embodiments is an extended coordination polymer as described herein, makes up all, substantially all, or at least a majority of the flame retardant product, such as at least 75%, 85%, 90%, 95%, 98%, or higher, or any range therebetween, by weight of the flame retardant product.

A compound of empirical formula (II) or (III) (e.g., (IIIa)) may be produced with high conversion based on the metal or metal compound, such as at least 70%, 80%, 85%, 90%, 95%, 98% or higher conversion, e.g., at least 70 to 95% or higher conversion. In certain embodiments, M is aluminum (i.e., the reaction product is produced using aluminum or one or more aluminum compounds, such as those described herein) or iron (i.e., the reaction product is produced using iron or one or more iron compounds, such as those described herein).

The phosphonic acid used in the present process may be represented by formula (I)

(I)

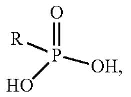

wherein R is H, alkyl, aryl, alkylaryl, or arylalkyl. In many embodiments, R is H, $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl. In some embodiments, said alkyl, aryl, alkylaryl, or arylalkyl are unsubstituted $C_{1-12}$ alkyl, $C_6$ aryl, $C_{7-10}$ alkylaryl, or $C_{7-10}$ arylalkyl, for example, $C_{1-6}$ alkyl, phenyl, or $C_{7-9}$ alkylaryl. In some embodiments, R is substituted or unsubstituted $C_{1-6}$ alkyl, $C_6$ aryl, $C_{7-10}$ alkylaryl, or $C_{7-12}$ arylalkyl, e.g., $C_{1-4}$ alkyl, $C_6$ aryl, $C_{7-9}$ alkylaryl, or $C_{7-10}$ arylalkyl. In many embodiments, R is unsubstituted $C_{1-12}$ alkyl, e.g., $C_{1-6}$ alkyl. In many embodiments, lower alkyl phosphonic acids are used, e.g., methyl-, ethyl-, propyl-, isopropyl-, butyl-, t-butyl- and the like.

R as alkyl may be a straight or branched chain alkyl group having the specified number of carbons and includes e.g., unbranched alkyls such as methyl, ethyl, propyl, butyl, pentyl, hexyl heptyl, octyl, nonyl, decyl, undecyl, dodecyl, and branched alkyl such as isopropyl, isobutyl, sec-butyl, t-butyl, ethyl hexyl, t-octyl and the like. For example, R as alkyl may be chosen from methyl, ethyl, propyl, isopropyl, butyl, isobutyl, sec-buty, and t-butyl. In many embodiments, R is methyl, ethyl, propyl or isopropyl, for example methyl or ethyl.

Often, when R is aryl it is phenyl. Examples of R as alkylaryl include phenyl substituted by one or more alkyl groups, for example groups selected from methyl, ethyl, propyl, isopropyl, butyl, isobutyl, sec-buty, t-butyl, and the like. Examples of R as arylalkyl, include for example, benzyl, phenethyl, styryl, cumyl, phenpropyl and the like.

In many embodiments, R is chosen from methyl, ethyl, propyl, isopropyl, butyl, phenyl and benzyl.

The pyrophosphonic acid used in the present process may be represented by formula (Ia)

(Ia)

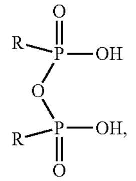

wherein R is as described above for formula (I).

The general reaction scheme with a pyrophosphonic acid and a suitable metal compound can be represented as

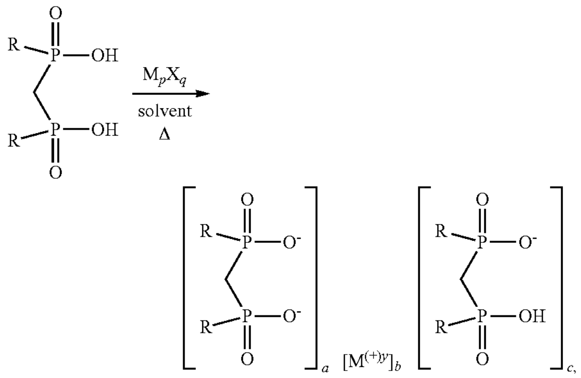

where R, M, X, p, q, y, a, b, and c are as described herein.

The process of the present disclosure may employ more than one phosphonic acid, more than one pyrophosphonic acid, or a combination of phosphonic and pyrophosphonic acids. In some embodiments, the phosphonic acid or pyrophosphonic acid is generated in situ. For example, preparing the reaction mixture may include preparing phosphonic or pyrophosphonic acid, such as by hydrolysis of higher oligomer phosphonic acid and/or cyclic phosphonic acid anhydride starting materials.

The solvent (i.e., component (b)) may be any solvent capable of dissolving the phosphonic or pyrophosphonic acid component (a), should be inert or substantially inert to the reaction between the phosphonic or pyrophosphonic acid (a) and the metal or suitable metal compound (c), and may further be chosen taking into account other reaction parameters, e.g., the preparation and/or reaction temperature or the type of metal or suitable metal compound, such as to prepare a homogenous or substantially homogenous reaction mixture. In some embodiments, the solvent (b) may be a combination of solvents for the phosphonic or pyrophosphonic acid. Often, the phosphonic or pyrophosphonic acid (a) is substantially or completely dissolved in the solvent (b). For example, the phosphonic or pyrophosphonic acid (a) and the solvent (b) may form a solution. In some embodiments, the phosphonic or pyrophosphonic acid (a) may be partially dissolved and partially suspended or dispersed in the solvent (b). The type of solvent, the amount of solvent relative to the phosphonic or pyrophosphonic acid, and the mixing conditions can be chosen to achieve the desired level of dissolution of the phosphonic acid, such as to obtain a high concentration of phosphonic or pyrophosphonic acid in the mixture while maintaining the phosphonic or pyrophosphonic acid in solution. Often, the ratio of the phosphonic acid (a) to the solvent (b) ranges from about 10:1 to 1:10, about 5:1 to 1:5, or about 3:1 to 1:3, by weight. In some embodiments where the phosphonic acid (a) is partially dissolved and partially suspended or dispersed in the solvent (b), the preparation temperature or reaction temperature may be selected at or higher than the melting temperature of the phosphonic acid to liquefy the phosphonic acid which is suspended or dispersed in the solvent.

As described above, depending on the reaction temperature and the boiling temperature of the solvent for the phosphonic or pyrophosphonic acid (i.e., component b in the reaction mixture), at least a portion of the solvent may boil off from the reaction mixture while heating to or at the reaction temperature. In some embodiments, all, substantially all, or at least a majority of the solvent (b) boils off from the reaction mixture during heating. The solvent (b) may be high-boiling (e.g., sulfolane or dimethyl sulfoxide (DMSO)) or low-boiling (e.g., chloroform or tetrahydrofuran (THF)). For example, in some embodiments, the solvent boils at a temperature at or below the reaction temperature such that at least a portion of the solvent boils off during heating of the reaction mixture, e.g., where all, substantially all, or a majority of the solvent boils off. The reaction temperature may be selected at or higher than the melting temperature of the phosphonic or pyrophosphonic acid to ensure that the same remains in liquid form as the solvent boils off. In this way, use of a larger excess of phosphonic or pyrophosphonic acid in the reaction mixture may allow the phosphonic or pyrophosphonic acid to serve as both a reactant and a solvent for the reaction.

In still other embodiments, the solvent has a boiling temperature higher than the reaction temperature, ensuring it will remain in the product reaction mixture, from which the flame retardant product of the reaction can be isolated, as described herein. In some embodiments, the reaction temperature is selected below the melting temperature of the phosphonic or pyrophosphonic acid.

Suitable solvents may be organic or inorganic. Examples of suitable solvents for the phosphonic or pyrophosphonic acid include, but are not limited to, water, sulfones, sulfoxides, halogenated (e.g., chlorinated) hydrocarbons, aromatic hydrocarbons, and ethers. For example, in some embodiments, the solvent may be chosen from water, sulfolane, dimethylsulfone, tetrahydrofuran (THF), dimethoxyethane (DME), 1,4-dioxane, dimethyl sulfoxide (DMSO), 1,2-dichlorobenzene, chloroform, carbon tetrachloride, xylene and mesitylene. In some embodiments, the solvent comprises water. In some embodiments, the solvent comprises an aqueous solution. In some embodiments, the reaction mixture is an aqueous reaction mixture.

The solvent may be protic or aprotic. In many embodiments, the solvent for pyrophosphonic acid is an aprotic solvent.

In some embodiments, the solvent (b) comprises a sulfone of the formula $R_1R_2SO_2$, wherein $R_1$ and $R_2$ are independently chosen from $C_{1-6}$ hydrocarbon groups, e.g., $C_{1-3}$ hydrocarbon groups, or $R_1$ and $R_2$ taken together with S form a ring having 2, 3, 4, or 5 carbon atoms, which ring may be unsubstituted or $C_{1-3}$ alkyl-substituted. In some embodiments, $R_1$ and $R_2$ taken together with S form a di-, tri-, tetra-, or penta-methylene ring. In some embodiments, $R_1$ and $R_2$ are independently chosen from $C_{1-6}$ alkyl. In some embodiments, $R_1$ or $R_2$ is $C_{1-6}$ alkyl and the other is $C_{1-3}$ alkyl. In some embodiments, $R_1$ and $R_2$ are independently chosen from $C_{1-3}$ alkyl. The alkyl groups may be branched or straight-chained. In some embodiments, $R_1$ and $R_2$ are both methyl, both ethyl, or both propyl. In other embodiments, $R_1$ or $R_2$ is methyl and the other is ethyl or propyl. In other embodiments, $R_1$ or $R_2$ is ethyl and the other is propyl. In some embodiments, the sulfone is sulfolane.

As used herein, "suitable metal compound" and the like refer to a compound of the formula $$M_p^{(+)y}$$

$X_q$, where M is a metal capable of forming a polycation, e.g., a metal that forms a cation of 2+, 3+, 4+, or 5+, typically 2+, 3+, or 4+, and X is any anion that provides a charged balanced compound with metal M. Suitable examples for X include, but are not limited to, anions that, together with the metal M, form oxides, halides, alkoxides, hydroxides, carbonates, carboxylates, and phosphonates. The values for p and q provide a charge balanced metal compound, for example, alumina, $Al_2O_3$. In some embodiments, an unsubstituted metal, M, is used as described herein. Examples of suitable metals (M) include, but are not limited to, Mg, Ca, Ba, Zn, Zr, Ge, B, Al, Si, Ti, Cu, Fe, Co, Ga, Bi, Mn, Sn or Sb. In some embodiments, M is chosen from Mg, Ca, Ba, Zn, Zr, Ga, B, Al, Si, Ti, Cu, Fe, Sn or Sb. In some embodiments, M is chosen from Mg, Ca, Ba, Zn, Zr, B, Al, Si, Ti, Fe, Sn or Sb, e.g., M may be Mg, Zn, Ca, Fe or Al.

Suitable metal compounds include, but are not limited to, compounds having a metal-oxygen bond, metal-nitrogen bond, metal-halogen bond, metal-hydrogen bond, metal-phosphorus bond, metal sulfur bond, metal boron bond, etc., for example, oxides, halides, alkoxides, hydroxides, carboxylates, carbonates, phosphonates, phosphinates, phosphonites, phosphates, phosphites, nitrates, nitrites, borates, hydrides, sulfonates, sulfates, sulfides, etc., of Mg, Ca, Ba, Zn, Zr, Ge, B, Al, Si, Ti, Cu, Fe, Co, Ga, Bi, Mn, Sn or Sb, for example, oxides, hydroxides, halides, or alkoxides of Mg, Ca, Ba, Zn, Zr, Ga, B, Al, Si, Ti, Cu, Fe, Sn or Sb; such as, oxides, hydroxides, halides, or alkoxides of Mg, Ca, Ba, Zn, Zr, B, Al, Si, Ti, Fe, Sn or Sb, e.g., oxides, hydroxides, halides, or alkoxides of Mg, Zn, Ca, Fe or Al.

In some embodiments, the metal, M, of the metal or suitable metal compound is aluminum or iron. In some embodiments, the suitable metal compound is chosen from halides, oxides, hydroxides, alkoxides, carbonates, carboxylates and phosphonates of aluminum. In some embodiments, the suitable metal compound is chosen from halides, oxides, hydroxides, and alkoxides of aluminum. In some embodiments, the suitable metal compound is chosen from alumina, aluminum trichloride, aluminum trihydroxide, aluminum isopropoxide, aluminum carbonate, and aluminum acetate. In other embodiments, the suitable metal compound is chosen from halides, oxides, alkoxides, carbonates, and acetates of iron. In some embodiments, the suitable metal compound is chosen from iron(III) oxide, iron(III) chloride, iron(III) isopropoxide, and iron(III) acetate.

In some embodiments, the suitable metal compound is a metal phosphonate salt. The metal in the metal phosphonate salt may be a metal, M, as described herein. In some embodiments, the metal phosphonate salt is prepared from the reaction of an initial metal compound and a phosphonic acid with a solvent (e.g., water) for the phosphonic acid. The initial metal compound may be a compound according to the suitable metal compound described herein. In some embodiments, the initial metal compound and the phosphonic acid are reacted at a temperature at or around room temperature or at a temperature ranging from about 0 to about 20° C. The resulting metal phosphonate salt may then be used as the suitable metal compound according to the inventive process herein. For example, a phosphonic acid, e.g., one or more than one alkyl phosphonic acid as above, and a solvent (e.g., water) may be stirred to form a homogeneous solution. The solution may be cooled, e.g., from about 0 to about 20° C., and an initial metal compound, such as a metal oxide, halide, alkoxide, or hydroxide, is added to react with the phosphonic acid. A metal phosphonate salt is formed, which is then used as the suitable metal compound in accordance with the presently disclosed process.

In certain embodiments, R as shown herein is methyl, ethyl, propyl, isopropyl or butyl and M is Al, Fe, Zn or Ca. In further embodiments, X is an oxygen, hydroxy, alkoxy or halogen.

The reaction as described herein may, but need not, be run under reduced pressure or vacuum.

The product reaction mixture formed from the reaction described herein, often presenting as a slurry, may be combined with an additional solvent, which may be the same or a different solvent than the solvent used in the reaction mixture. The additional solvent may, for example, be chosen from those described herein for the solvent component (b). The additional solvent/slurry mixture may be agitated as desired to break up any clumps that may have formed. The solid product may be isolated by filtration, optionally washed and dried, to yield the product in the form of a powder or small particles. In some cases, the product may be sieved to refine the particle size.

The reaction as described herein may optionally be facilitated with a seeding material. For example, use of a seeding material may reduce the time to achieve conversion to the flame retardant product and may lead to increased consistency in the product's physical characteristics. Thus, in some embodiments, the reaction mixture further comprises a seeding material (d). Often, the seeding material is added to the reaction mixture upon or after heating to the reaction temperature. In many embodiments, the seeding material is added before conversion to and/or precipitation of the flame retardant product occurs. In some embodiments, the seeding material comprises a flame retardant material produced according to the process of the present disclosure, such as a flame retardant compound of empirical formula (II), (III), or (IIIa) as described herein. The seeding material may be selected or refined to have a desired particle size.

In some embodiments, the suitable metal compound is alumina, and the flame retardant material is produced as follows:

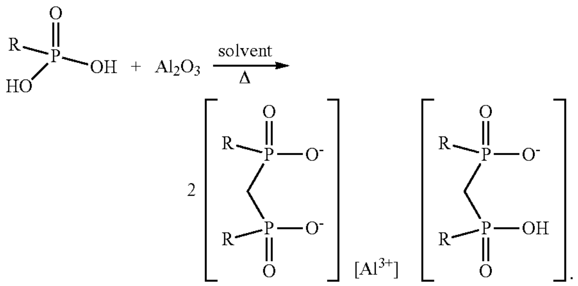

In one example, a reaction mixture comprising a phosphonic acid, such as a $C_1$-$C_{12}$ alkyl phosphonic acid (e.g., methyl, ethyl, propyl, iso-propyl, butyl or t-butyl phosphonic acid), a solvent for the phosphonic acid, such as water, and an oxide, hydroxide, halide, alkoxide, carbonate or carboxylate of Al, such as alumina, aluminum trichloride, aluminum trihydroxide, aluminum isopropoxide, aluminum carbonate or aluminum acetate, is heated to a reaction temperature as described herein, such as about 115° C. or higher, about 125° C. or higher, about 150° C. or higher, or about 165° C. or higher. Typically, a slurry forms as the reaction proceeds, and the solid flame retardant product may be isolated by filtration to yield the product in the form of a powder or small particles. Additional workup on the product reaction mixture may be performed prior to isolating the solid product, such as cooling the product reaction mixture above or no less than the melting point of excess phosphonic acid and combining with an additional solvent as described herein, e.g., water. The additional solvent/slurry mixture may be optionally agitated as described above. The solid flame retardant product may be isolated by filtration, optionally washed with additional solvent and dried, to yield the product in the form of a powder or small particles. The flame retardant product contains phosphorus and aluminum in a 4:1 ratio of phosphorus to aluminum according to the following empirical formula:

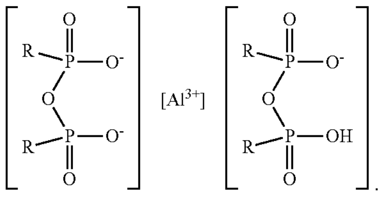

In a further example, the example described directly above is performed with iron or a suitable iron compound, such as halides, oxides, alkoxides, carbonates, or acetates of iron, e.g., iron(III) oxide, iron(III) chloride, iron(III) isopropoxide, or iron(III) acetate. The flame retardant product contains phosphorus and iron in a 4:1 ratio according to the following empirical formula:

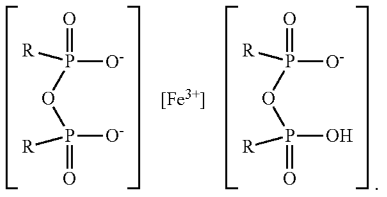

Often, the compound of the empirical formulas above (which in many embodiments is an extended coordination polymer as described herein) makes up all, substantially all, or at least a majority of the flame retardant product, such as at least 75%, 85%, 90%, 95%, 98%, or higher, or any range therebetween, by weight of the flame retardant product.

In a further embodiment, the suitable metal compound (c) is a metal phosphonate salt of the following formula:

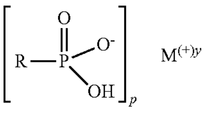

wherein R and M are as described above, p is a number of from 2 to 5, e.g., 2, 3 or 4, and y is a number of from 2 to 5, e.g., 2, 3 or 4, so that $M^{(+)y}$ is a metal cation where (+)y represents the charge formally assigned to the cation. Typically the metal phosphonate salt is charge balanced (i.e., p=y). The metal phosphonate salt may be prepared according to methods known in the art.

In one example, a phosphonic acid, such as an alkyl phosphonic acid (e.g., methyl, ethyl, propyl, iso-propyl, butyl or t-butyl phosphonic acid) is combined with water (e.g., about 1:1 by weight) and is stirred and cooled to below room temperature (e.g., cooled to or below 10° C., such as about 0° C.). An initial metal compound is added to the mixture of phosphonic acid and water to form a metal phosphonate salt. The metal phosphonate salt is then used as the suitable metal compound in the process of the present disclosure to produce the flame retardant product in the form of a powder or small particles. In embodiments involving an aluminum phosphonate salt as the suitable metal compound, the flame retardant product contains phosphorus and aluminum in a 4:1 ratio of phosphorus to aluminum according to the following empirical formula:

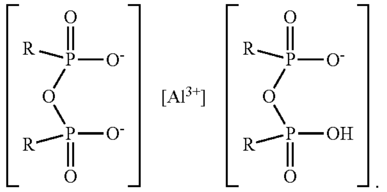

Often, the compound of the empirical formula (which in many embodiments is an extended coordination polymer as described herein) makes up all, substantially all, or at least a majority of the flame retardant product, such as at least 75%, 85%, 90%, 95%, 98%, or higher, or any range therebetween, by weight of the flame retardant product.

The flame retardant of the invention may be used with a variety of other flame retardants and/or synergists or flame retardant adjuvants as known in the art. For example, the flame retardant of the invention may be formulated with one or more materials selected from:

carbon black, graphite, carbon nanotubes, siloxanes, polysiloxanes; polyphenylene ether (PPE), phosphine oxides and polyphosphine oxides, e.g., benzylic phosphine oxides, poly benzylic phosphine oxides and the like;

melamine, melamine derivatives and melamine condensation products, melamine salts such as, but not limited to, melamine cyanurate, melamine borate, melamine phosphates, melamine metal phosphates, melam, melem, melon, and the like;

inorganic compounds including clays, metal salts such as hydroxides, oxides, oxide hydrates, borates, carbonates, sulfates, phosphates, phosphites, hypophosphites, silicates, mixed metal salts, etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide and zinc borate, zinc molybdate (or complexes thereof, e.g., Kemgard 911B), zinc molybdate/magnesium hydroxide complex (e.g., Kemgard MZM), zinc molybdate/magnesium silicate complex (Kemgard 911C), calcium molybdate/zinc complex (e.g., Kemgard 911A), zinc phosphate (or complexes thereof, e.g., Kemgard 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, and zinc oxide or oxide hydrate, zirconium oxide and/or zirconium hydroxide and the like.

Unless otherwise specified, in the context of the present application, the term "phosphate" when used as a component in a "phosphate salt", such as in metal phosphate, melamine phosphate, melamine metal phosphate, etc., refers to a phosphate, hydrogen phosphate, dihydrogen phosphate, pyrophosphate, polyphosphate, or a phosphoric acid condensation products anion or polyanion.

Likewise, unless otherwise specified, in the context of the present application, the term "phosphite" when used as a component in a "phosphite salt", such as in metal phosphite, etc., refers to a phosphite or hydrogen phosphite.

The flame retardant of the invention may also be formulated with other flame retardants such as halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid. In some embodiments, the flame retardant comprises a mixture of the flame retardant according to the instant disclosure and a phosphinic salt of the following formula (e.g., an aluminum tris(dialkylphosphinate),

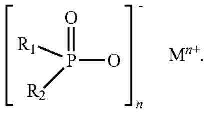

$R_1$ and $R_2$ each independently may be a group according to R as described herein, M is a metal as described herein (e.g., Al or Ca), and n is a number of from 2 to 7, e.g., from 2 to 4, often 2 or 3.

In many embodiments, a flame retardant polymer composition according to the present disclosure comprises (i) a polymer, (ii) a flame retardant material of the present disclosure, and (iii) one or more additional flame retardants and/or one or more synergists or flame retardant adjuvants.

For example, in some embodiments the flame retardant polymer composition comprises one or more additional flame retardants, e.g., halogenated flame retardants, phosphine oxide flame retardants, alkyl or aryl phosphonates, or salts of alkyl or aryl phosphinates, e.g., an aluminum tris (dialkylphosphinate) such as aluminum tris(diethylphosphinate).

In some embodiments the flame retardant polymer composition comprises one or more synergists or flame retardant adjuvants, e.g., melamine, melamine derivatives and melamine condensation products (e.g., melam, melem, melon), melamine salts, phosphine oxides and polyphosphine oxides, metal salts such as hydroxides, oxides, oxide hydrates, borates, phosphates, phosphonates, phosphites, silicates and the like, e.g. aluminum hydrogen phosphite, melem or a melamine metal phosphate, e.g., a melamine metal phosphate wherein the metal comprises aluminum, magnesium or zinc. In particular embodiments the one or more additional flame retardant, synergist or flame retardant adjuvant comprises an aluminum tris(dialkylphosphinate), aluminum hydrogen phosphite, methylene-diphenylphosphine oxide-substituted polyaryl ether, xylylenebis(diphenylphosphine oxide), 4,4'-bis(diphenylphosphinylmethyl)-1,1'-biphenyl, ethylene bis-1,2-bis-(9,10-dihydro-9-oxy-10-phosphaphenanthrene-10-oxide)ethane, melem, melam, melon, or dimelamine zinc pyrophosphate.

Certain embodiments provide a halogen free polymer composition. In such embodiments, halogen containing flame retardants or synergists would be excluded as much as possible.

The flame retardant material of the present disclosure may be combined with an additional flame retardant, synergist or adjuvant in a range of 100:1 to 1:100 by weight of the inventive flame retardant to the total weight of additional flame retardant, synergist and/or adjuvant. In some embodiments, the flame retardant material of the present disclosure is present in a range of 10:1 to 1:10 by weight of the inventive flame retardant to the total weight of additional flame retardant, synergist and/or adjuvant, for example, weight ratios ranging from 7:1 to 1:7, 6:1 to 1:6, 4:1 to 1:4, 3:1 to 1:3 and 2:1 to 1:2. The inventive flame retardant is often the majority component in such a combination, e.g., a 10:1 to 1.2:1 ratio or a 7:1 to 2:1 ratio by weight of the inventive flame retardant material to the total weight of additional flame retardant, synergist and/or adjuvant, but the inventive material can also be the minor component of the mixture, e.g., a 1:10 to 1:1.2 ratio or a 1:7 to 1:2 ratio.

The thermally stable flame retardant of the invention can be compounded into thermoplastic polymers at high temperatures, such as high temperature polyamides and polyterephthalate esters, without decomposing or negatively impacting the physical properties of the polymer, and the flame retardant activity is excellent. The flame retardant of the invention may be used in other polymers, with other synergists and with conventional polymer additives.

The polymer of the flame retardant composition of the present invention may be any polymer known in the art, such as polyolefin homopolymers and copolymers, rubbers, polyesters including polyalkylene terephthalates, epoxy resins, polyurethanes, polysulfones, polyimides, polyphenylene ethers, styrenic polymers and copolymers, polycarbonates, acrylic polymers, polyamides, polyacetals, and biodegradable polymers. Mixtures of different polymers, such as polyphenylene ether/styrenic resin blends, polyvinyl chloride/acrylonitrile butadiene styrene (ABS) or other impact modified polymers, such as methacrylonitrile and $\alpha$-methylstyrene containing ABS, and polyester/ABS or polycarbonate/ABS and polyester or polystyrene plus some other impact modifier may also be used. Such polymers are available commercially or made by means well known in the art.

The flame retardant of the invention is particularly useful in thermoplastic polymers that are processed and/or used at high temperatures, for example, styrenic polymers including high impact polystyrene (HIPS), polyolefins, polyesters, polycarbonates, polyamides, polyurethanes, polyphenylene ethers and the like.

For example, the polymer may be a polyester-series resin, a styrenic resin, a polyamide-series resin, a polycarbonate-series resin, a polyphenylene oxide-series resin, a vinyl-series resin, an olefinic resin, an acrylic resin, epoxy resin, or a polyurethane. The polymer can be a thermoplastic or a thermoset resin and may be reinforced, e.g., glass reinforced. In some embodiments, the polymer is a thermoplastic polyurethane. In some embodiments, the polymer is a thermosetting epoxy resin. More than one polymer resin may be present. In particular embodiments the polymer is an engineering polymer, e.g., a thermoplastic or reinforced thermoplastic polymer, e.g., glass reinforced thermoplastic polymer, such as an optionally glass filled polyester, epoxy resin or polyamide, for example, a glass-filled polyester such as a glass filled polyalkylene terephthalate, or a glass filled polyamide.

Polyester-series resins include homopolyesters and copolyesters obtained by, for example, polycondensation of a dicarboxylic acid component and a diol component, and polycondensation of a hydroxycarboxylic acid or a lactone component, for example, aromatic saturated polyester-series resin, such as polybutylene terephthalate or polyethylene terephthalate.

Polyamide (PA)-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components. Examples of polyamide-series resins include aliphatic polyamides such as PA 46, PA 6, PA 66, PA 610, PA 612, PA 11 and PA 12, polyamides obtained from an aromatic dicarboxylic acid, e.g., terephthalic acid and/or isophthalic acid, and an aliphatic diamine, e.g., hexamethylenediamine or nonamethylenediamine, and polyamides obtained from both aromatic and aliphatic dicarboxylic acids, e.g., both terephthalic acid and adipic acid, and an aliphatic diamine, e.g., hexamethylenediamine, and others. These polyamides may be used singly or in combination. In some embodiments, the polymer comprises PA 6. In some embodiments, the polymer comprises PA 66. In some embodiments, the polymer comprises a polyphthalamide.

Polyamides with melting points of at least 280° C. are used extensively for producing molding compositions which make possible the production of molded articles, e.g. for the electrical and electronics industry, with excellent dimensional stability at high temperatures and with very good flame-retardant properties. Molding compositions of this type are demanded for example in the electronics industry for producing components which are mounted on printed circuit boards according to the so-called surface mounting technology, SMT. In this application, these components must withstand temperatures of up to 270° C. for short periods of time without dimensional change.

Such high temperature polyamides include certain polyamides produced from alkyl diamines and diacids as polyamide 4,6, however many high temperature polyamides are aromatic and semi-aromatic polyamides, i.e., homopolymers, copolymers, terpolymers, or higher polymers that are derived from monomers containing aromatic groups. A single aromatic or semi-aromatic polyamide may be employed or blends of aromatic and/or semi-aromatic polyamides are used. It is also possible that the preceding polyamide and polyamide blends are blended with other polymers, including aliphatic polyamides.

Examples of these high temperature aromatic or semi-aromatic polyamides include polyamide 4T, poly(m-xylylene adipamide) (polyamide MXD,6), poly(dodecamethylene terephthalamide) (polyamide 12,T), poly (decamethylene terephthalamide) (polyamide 10,T), poly (nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T); hexamethylene adipamide/hexamethylene terephthalamide/hexamethylene isophthalamide copolyamide (polyamide 6,6/6,T/6,I); poly (caprolactam-hexamethylene terephthalamide) (polyamide 6/6,T); hexamethylene terephthalamide/hexamethylene isophthalamide (6,T/6,I) copolymer; and the like.

Certain embodiments of the invention are thus to compositions comprising a polyamide that melts at high temperatures, e.g., 280° C. or higher, 300° C., or higher, in some embodiments 320° C. or higher, e.g. from 280 to 340° C., such as polyamide 4,6 and the aromatic and semi-aromatic polyamide described above, articles comprising high temperature polyamides and the flame retardant material of the invention, methods for preparing the compositions and methods for shaping the articles.

As described herein, in many embodiments of the present disclosure, the flame retardant polymer composition comprises (i) a polymer, (ii) the flame retardant of the present disclosure, and (iii) one or more additional flame retardants and/or one or more synergists or flame retardant adjuvants. Thus, while the flame retardant (ii) alone exhibits excellent activity in polymer systems, it may be used in combination with (iii) one or more compounds chosen from other flame retardants, synergists and adjuvants. Exemplary compounds (iii) include halogenated flame retardants, alkyl or aryl phosphine oxides, alkyl or aryl polyphosphine oxides, alkyl or aryl phosphates, alkyl or aryl phosphonates, alkyl or aryl phosphinates, salts of alkyl or aryl phosphinic acid, carbon black, graphite, carbon nanotubes, siloxanes, polysiloxanes, polyphenylene ether, melamine, melamine derivatives, melamine condensation products, melamine salts, metal hydroxides, metal oxides, metal oxide hydrates, metal borates, metal carbonates, metal sulfates, metal phosphates, metal phosphonates, metal phosphites, metal hypophosphites, metal silicates, and mixed metal salts. For example, the one or more compounds (iii) may be chosen from aluminum tris(dialkylphosphinate), aluminum hydrogen phosphite, benzylic phosphine oxides, poly benzylic phosphine oxides, melam, melem, melon, melamine phosphates, melamine metal phosphates, melamine cyanurate, melamine borate, talc, clays, calcium silicate, aluminosilicate, aluminosilicate as hollow tubes, calcium carbonate, magnesium carbonate, barium sulfate, calcium sulfate, boron phosphate, calcium molybdate, exfoliated vermiculite, zinc stannate, zinc hydroxystannate, zinc sulfide, zinc borate, zinc molybdate, zinc phosphate, magnesium oxide, magnesium hydroxide, aluminum oxide, aluminum oxide hydroxide, aluminum trihydrate, silica, tin oxide, antimony oxide (III and V), antimony (III and V) oxide hydrate, titanium oxide, zinc oxide, zinc oxide hydrate, zirconium oxide, and zirconium hydroxide. For example, the one or more compounds (iii) may be chosen from aluminum tris(dimethylphosphinate), aluminum tris(diethylphosphinate), aluminum tris(dipropylphosphinate), aluminum tris(dibutylphosphinate), methylene-diphenylphosphine oxide-substituted polyaryl ether, xylylenebis(diphenylphosphine oxide), 1,2-bis-(9,10-dihydro-9-oxy-10-phosphaphenanthrene-10-oxide)ethane, 4,4'-bis(diphenylphosphinylmethyl)-1,1'-biphenyl, melam, melem, melon, and dimelamine zinc pyrophosphate.

In some embodiments, the flame retardant synergist comprises a material chosen from melam, melem, melon, melamine cyanurate, melamine polyphosphate, and melamine-poly(metal phosphate) (e.g., melamine-poly(zinc phosphate) (Safire 400)). In some embodiments, the synergist comprises a triazine-based compound, such as a reaction product of trichlorotriazine, piperazine and morpholine, e.g., poly-[2,4-(piperazine-1,4-yl)-6-(morpholine-4-yl)-1,3,5-triazine]/piperazin (MCA® PPM Triazine HF). In some embodiments, the synergist comprises a metal hypophosphite, such as aluminum hypophosphite (e.g., Italmatch Phoslite® IP-A). In some embodiments, the synergist comprises an organic phosphinate, such as aluminum dialkylphosphinate, e.g., aluminum diethylphosphinate (Exolit OP).

In some embodiments, the flame retardant polymer composition comprises one or more compounds chosen from hydrotalcite clays, metal borates, metal oxides, and metal hydroxides, such as metal borates, metal oxides, or metal hydroxides wherein the metal is zinc or calcium.

The concentration of the inventive flame retardant in the polymer composition is of course dependent on the exact chemical composition of the flame retardant, the polymer and other components found in the final polymer composition. For example, when used as the sole flame retarding component of a polymer formulation the inventive flame retardant may be present in a concentration of from 1 to 50%, e.g., 1 to 30%, by weight of the total weight of the final composition. Typically, when used as the sole flame retardant there will be at least 2% of the inventive material present, for example 3% or more, 5% or more, 10% or more, 15% or more, 20% or more or 25% or more. In many embodiments, the inventive flame retardant is present in amounts up to 45%, while in other embodiments, the amount of inventive flame retardant is 40% of the polymer composition or less, e.g., 35% or less. When used in combination with other flame retardants or flame retardant synergists, less of the inventive material may be needed.

Any known compounding techniques may be used to prepare the flame retardant polymer composition of the present disclosure, for example, the flame retardant may be introduced into molten polymer by blending, extrusion, fiber or film formation etc. In some cases the flame retardant is introduced into the polymer at the time of polymer formation or curing, for example, the flame retardant of the invention may be added to a polyurethane prepolymer prior to crosslinking or it may be added to a polyamine or alkyl-polycarboxyl compound prior to polyamide formation or to an epoxy mixture prior to cure.

The flame retardant polymer composition of the invention will often contain one or more of the common stabilizers or other additives frequently encountered in the art, such as phenolic antioxidants, hindered amine light stabilizers (HALS), the ultraviolet light absorbers, phosphites, phosphonites, alkaline metal salts of fatty acids, hydrotalcites, metal oxides, borates, epoxidized soybean oils, hydroxylamines, tertiary amine oxides, lactones, thermal reaction products of tertiary amine oxides, thiosynergists, basic co-stabilizers, for example, melamine, melem, etc., polyvinylpyrrolidone, dicyandiamide, triallyl cyanurate, urea derivatives, hydrazine derivatives, amines, polyamides, polyurethanes, hydrotalcites, alkali metal salts and alkaline earth metal salts of higher fatty acids, for example, Ca stearate, calcium stearoyl lactate, calcium lactate, Zn stearate, Zn octoate, Mg stearate, Na ricinoleate and K palmitate, antimony pyrocatecholate or zinc pyrocatecholate, nucleating agents, clarifying agents, etc.

Other additives may also be present, for example, plasticizers, lubricants, emulsifiers, pigments, dyes, optical brighteners, other flame proofing agents, anti-static agents, blowing agents, anti-drip agents, e.g., PTFE, and the like.

Optionally the polymer may include fillers and reinforcing agents, for example, calcium carbonate, silicates, glass fibers, talc, kaolin, mica, barium sulfate, metal oxides and hydroxides, carbon black and graphite. Such fillers and reinforcing agents may often be present at relatively high concentrations, including formulations where the filler or reinforcement is present in concentrations of over 50 wt % based on the weight of the final composition. More typically, fillers and reinforcing agents are present from about 5 to about 50 wt %, e.g., about 10 to about 40 wt % or about 15 to about 30 wt % based on the weight of the total polymer composition.

In some embodiments, the flame retardant polymer composition of the present disclosure is formulated with any one or more materials selected from carbon black, graphite, carbon nanotubes, siloxanes, polysiloxanes, talc, calcium carbonate, magnesium carbonate, barium sulfate, calcium sulfate, calcium silicate, magnesium silicate, aluminosilicate hollow tubes (Dragonite), Halloysite, boron phosphate, calcium molybdate, exfoliated vermiculite, zinc stannate, zinc hydroxystannate, zinc sulfide, zinc borate, zinc molybdate (or complexes thereof, e.g., Kemgard 911B), zinc molybdate/magnesium hydroxide complex (e.g., Kemgard MZM), zinc molybdate/magnesium silicate complex (Kemgard 911C), calcium molybdate/zinc complex (e.g., Kemgard 911A), zinc phosphate (or complexes thereof, e.g., Kemgard 981) and the like;

hydroxides, oxides, and oxide hydrates of group 2, 4, 12, 13, 14, 15 (semi)metals, e.g., magnesium oxide or hydroxide, aluminum oxide, aluminum oxide hydroxide (Boehmite), aluminum trihydrate, silica, silicates, tin oxide, antimony oxide (III and V) and oxide hydrate, titanium oxide, and zinc oxide or oxide hydrate, zirconium oxide and/or zirconium hydroxide and the like; melamine and urea based resins such as melamine cyanurate, melamine borate, melamine polyphosphate, melamine pyrophosphate, polyphenylene ether (PPE) and the like; and clays, including e.g., hydrotalcite, boehmite, kaolin, mica, montmorillonite, wollastonite, nanoclays or organically modified nanoclays and the like.

In some embodiments, the flame retardant polymer composition of the present disclosure is formulated with any one or more materials selected from zinc borate, zinc stannate, polysiloxanes, kaolin, silica, magnesium hydroxide, zinc molybdate complex (e.g., Kemgard 911B), zinc molybdate/magnesium hydroxide complex (e.g., Kemgard MZM), zinc molybdate/magnesium silicate complex (Kemgard 911C), calcium molybdate/zinc complex (e.g., Kemgard 911A), zinc phosphate complex (e.g., Kemgard 981), and melamine-poly(metal phosphate) (e.g., melamine-poly(zinc phosphate) (Safire 400)).

In some embodiments, in addition to a polymer (such as described herein) and the flame retardant of the present disclosure, the flame retardant polymer composition comprises melam and any one or more materials selected from zinc borate, zinc stannate, zinc molybdate complex, zinc molybdate/magnesium hydroxide complex, zinc molybdate/magnesium silicate complex, calcium molybdate/zinc complex, zinc phosphate complex, and zinc oxide, optionally with additional additives, such as described herein.

In some embodiments, in addition to a polymer (such as described herein) and the flame retardant of the present disclosure, the flame retardant polymer composition comprises melon and any one or more materials selected from zinc borate, zinc stannate, zinc molybdate complex, zinc molybdate/magnesium hydroxide complex, zinc molybdate/magnesium silicate complex, calcium molybdate/zinc complex, zinc phosphate complex, and zinc oxide, optionally with additional additives, such as described herein.

Further non-limiting disclosure is provided in the Examples that follow.

EXAMPLES

Example 1

Methylphosphonic acid (MPA) (3678.8 g, 38.3 mol, 30 eq, 75% aqueous solution) and alumina (130.2 g, 1.28 mol, 1 eq) were mixed at room temperature with limited exotherm observed (about 2° C. increase). The pot temperature was set to 165° C., with stirrer at 200 RPM under atmospheric pressure, nitrogen purge (4 L/min). When no distillate water was observed at the condenser, 1.0 g of seeding material, which was the flame retardant product produced from MPA and alumina according to the present disclosure, was optionally added. The reaction mixture was heated at 165° C. for 3 hours. The product reaction mixture containing a white slurry product was then cooled to about 130° C. and poured into 1.5 L of water in a beaker cooled in an ice water bath. The white slurry was then filtered off, washed by water (500 mL×3), and dried to yield fine crystals at 92% yield. The product had a 4:1 phosphorus to aluminum ratio (ICP Elemental Analysis) according to the following empirical formula:

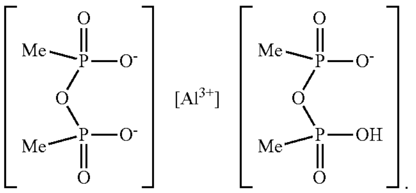

The product empirical formula above represents repeating monomer units (i.e., coordination entities) of a coordination polymer forming the pure crystalline product. Thermogravimetric analysis (TGA) of the product is shown in FIG. 1.

Example 2

A 1 L flask was charged with 800 mL xylenes and set up with a Dean-Stark trap. The solution was heated to 115° C. and methylphosphonic acid (MPA) (33.89 g, 0.35 mol) was added. The acid was allowed to dissolve and the temperature was increased such that the solution began to reflux. Alumina (4.01 g, 0.039 mol) was added in portions over 3 hours. The reflux was maintained at 142° C. overnight. The resulting solid product was isolated by filtration, washed with DMF (100 mL) and $Et_2O$ (2×50 mL), and dried to yield a fine powder (18.86 g, 71% yield). The product had a 4:1 phosphorus to aluminum ratio according to the following empirical formula:

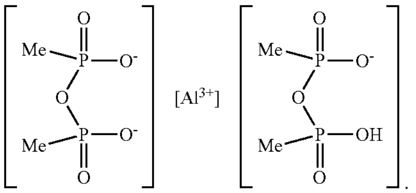

The product empirical formula above represents repeating monomer units (i.e., coordination entities) of a coordination polymer forming the pure crystalline product.

Example 3

Methylphosphonic acid (MPA) (2216 g, 23.1 mol, 15 eq, aqueous solution) and aluminum trihydroxide (120 g, 1.5 mol, 1 eq) were mixed at room temperature. The pot temperature was set to 165° C., with stirrer at 200 RPM under atmospheric pressure, nitrogen purge (4 L/min). When no distillate water was observed at the condenser, 1.0 g of seeding material, which was the flame retardant product produced from MPA and aluminum trihydroxide according to the present disclosure, was optionally added. The reaction mixture was heated at 165° C. for 3 hours. The product reaction mixture containing a white slurry product was then cooled to about 130° C. and poured into 1.5 L of water in a beaker cooled in an ice water bath. The white slurry was filtered off, washed by water (500 mL×3), and dried to yield fine crystals at approximately 100% yield. The product had a 4:1 phosphorus to aluminum ratio (ICP Elemental Analysis) according to the following empirical formula:

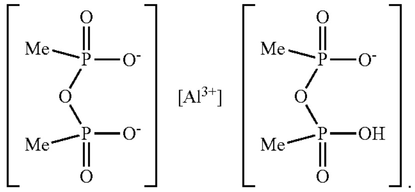

The product empirical formula above represents repeating monomer units (i.e., coordination entities) of a coordination polymer forming the pure crystalline product.

Example 4

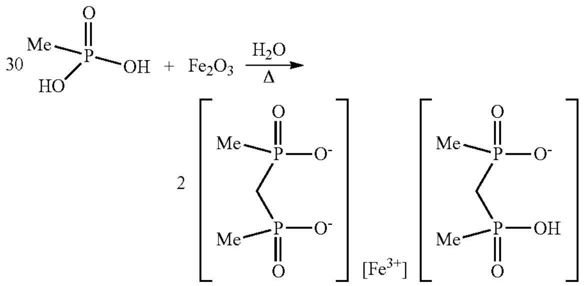

Methylphosphonic acid (MPA) (1412.6 g, 14.7 mol, 30 eq, 75% aqueous solution) and iron oxide (78.2 g, 0.49 mol, 1 eq) were mixed at room temperature. The pot temperature was set to 130° C. for about 12 hours, with stirrer at 250 RPM under atmospheric pressure, nitrogen purge (4 L/min). The reaction mixture was subsequently heated to 165° C. for 12 hours. The product reaction mixture containing an off-white slurry product was then cooled to about 130° C. and poured into 1.5 L of water in a beaker cooled in an ice water bath. The off-white slurry was filtered off, washed by water (500 mL×3), and dried to yield fine off-white color crystals at 92% yield. The product had a 4:1 phosphorus to iron ratio (ICP Elemental Analysis) according to the following empirical formula:

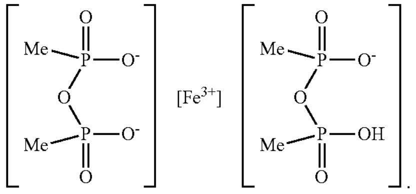

The product empirical formula above represents repeating monomer units (i.e., coordination entities) of a coordination polymer forming the pure crystalline product.

Example 5

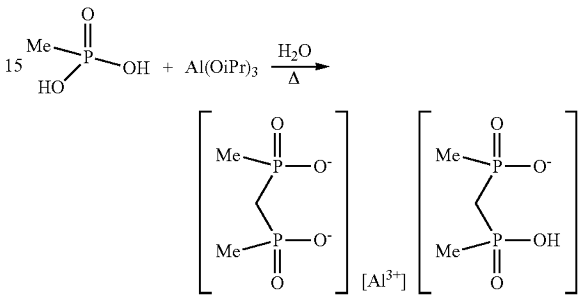

Methylphosphonic acid (MPA) (1727 g, 18.4 mol, 15 eq, 75% aqueous solution) was cooled to 5° C. in an ice water bath under nitrogen flow (1 L/min). Aluminum isopropoxide (250 g, 1.2 mol, 1 eq) was added in portions as the pot temperature was maintained below 10 degree C.

The pot temperature was then set to 165° C., with stirrer at 250 RPM. At 165° C., 4.5 g of seeding material, which was the flame retardant product produced from MPA and aluminum isopropoxide according to the present disclosure, was optionally added, and the reaction mixture was kept at 165° C. for 3 hours. The product reaction mixture containing a white slurry product was then cooled to about 130° C. and poured into 1.5 L of water in a beaker cooled in an ice water bath. The white slurry was filtered off, washed by water (500 mL×3), and dried to yield fine crystals at 44% yield. The product had a 4:1 phosphorus to aluminum ratio (ICP Elemental Analysis) according to the following empirical formula:

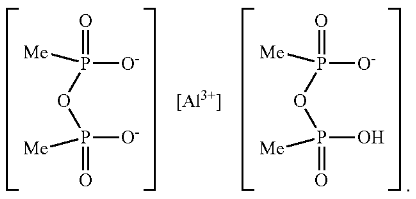

The product empirical formula above represents repeating monomer units (i.e., coordination entities) of a coordination polymer forming the pure crystalline product.

Example 6

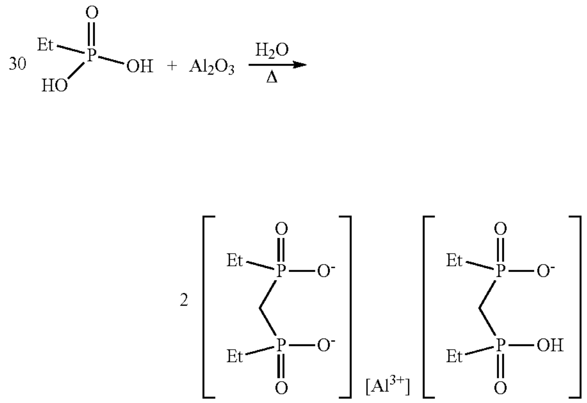

Ethylphosphonic acid (EPA) (55.0 g, 0.50 mol, 30 eq) and alumina (1.70 g, 17 mmol, 1 eq) were mixed at room temperature with 50 mL of water. The pot temperature was set to 165° C., with stirrer at 250 RPM under atmospheric pressure, nitrogen purge (4 L/min). The reaction mixture was heated at 165° C. for 3 hours. The product reaction mixture containing a white slurry product was then cooled to about 130° C. and poured into 100 mL of water in a beaker cooled in an ice water bath. The white slurry was filtered off, washed by water (50 mL×3), and dried to yield fine crystals at 76% yield. The product had a 4:1 phosphorus to aluminum ratio (ICP Elemental Analysis) according to the following empirical formula:

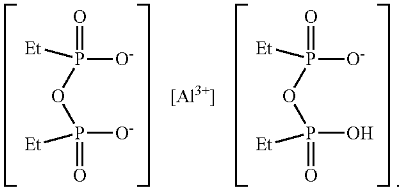

The product empirical formula above represents repeating monomer units (i.e., coordination entities) of a coordination polymer forming the pure crystalline product.

Example 7

Polymer compositions were prepared and evaluated for flame retardant activity under UL-94 testing. UL-94 V-0 ratings at 0.8 mm and 1.6 mm thicknesses were measured for glass filled polymer compositions of polyamide 6,6 containing the flame retardant produced according to Example 1 above:

TABLE 1

| Formulations with UL-94 V-0 rating at 0.8 and 1.6 mm | | | | |
|---|---|---|---|---|
| Substrate | Glass fiber | Inventive FR | Melam | Zinc borate |
| PA 6,6 | 30 wt % | 13 wt % | 10 wt % | 1 wt % |
| PA 6,6 | 30 wt % | 13.7 wt % | 10 wt % | — |

UL-94 V-0 ratings at 0.8 mm were also measured for glass filled polymer compositions of polyamide 6,6, polyamide 6, polybutylene terephthalate (PBT) and a high temperature polyamide containing the flame retardant produced according to Examples 1, 2, 3 and 5 above:

TABLE 2

| Compositions with UL-94 V-0 rating at 0.8 mm | | | | |
|---|---|---|---|---|
| Substrate | Glass fiber | Inventive FR | Melam | Melamine cyanurate |
| PA 6,6 | 30% | 12.5% | 10% | — |
| PA6 | 25% | 15% | — | 10% |
| PBT | 25% | 15% | 15% | — |
| High temp nylon | 25% | 18% | — | — |

Additional polymer compositions containing the flame retardant produced according to Examples 1, 2, 3 and 5 above combined with various synergists in glass filled PA 66, PBT and polyphthalamide were prepared and evaluated under UL-94 testing at 0.8 mm thickness. The results are provided in Table 3 (PA 66), Table 4 (PBT) and Table 5 (polyphthalamide).

Formulations 17, 22 and 24, which did not contain the inventive flame retardant, failed the UL-94 test.

TABLE 3

| | PA66 | | | | | | | | | | |
|---|---|---|---|---|---|---|---|---|---|---|---|
| Formulation | 7 | 8 | 9 | 10 | 11 | 12 | 13 | 14 | 15 | 16 | 17 |
| PA 66 wt % | 46.3 | 46.5 | 46.5 | 46 | 45 | 50 | 40.3 | 45.3 | 45.3 | 46.3 | 70 |
| Glass wt % | 30 | 30 | 30 | 30 | 30 | 30 | 30 | 30 | 30 | 30 | 30 |
| Inventive FR wt % | 13.7 | 10 | 10 | 13 | 14 | 12 | 13.7 | 13.7 | 13.7 | 13.7 | — |
| Melam wt % | 10 | 10 | 10 | 10 | 10 | — | — | — | — | — | — |
| Melem wt % | — | — | — | — | — | — | 16 | — | — | — | — |
| Melon wt % | — | — | — | — | — | — | — | 10 | 10 | — | — |
| Melamine polyphosphate wt % | — | — | — | — | — | 8 | — | — | — | — | — |
| Exolit OP 1230 wt % | — | 3.5 | — | — | — | — | — | — | — | — | — |
| Exolit OP 1400 wt % | — | — | 3.5 | — | — | — | — | — | — | — | — |
| PPM Triazine HF wt % | — | — | — | — | — | — | — | — | — | 10 | — |
| Zinc borate wt % | — | — | — | 1 | — | — | — | 1 | — | — | — |
| Zinc stannate wt % | — | — | — | — | 1 | — | — | — | 1 | — | — |
| UL 94 @ 1/32" (0.8 mm) | V-0 | V-0 | V-0 | V-0 | V-0 | V-0 | V-1 | V-0 | V-0 | V-1 | Fail |

TABLE 4

| PBT | | | | | |
|---|---|---|---|---|---|
| Formulation | 18 | 19 | 20 | 21 | 22 |
| PBT wt % | 50 | 50 | 50 | 45 | 75 |
| Glass wt % | 25 | 25 | 25 | 25 | 25 |
| Inventive FR wt % | 15 | 16 | 15 | 15 | — |
| Melam wt % | 10 | 9 | 9 | 15 | — |
| Polysiloxane wt % | — | — | 1 | — | — |
| UL 94 @ 1/32" (0.8 mm) | V-0 | V-0 | V-0 | V-0 | Fail |

TABLE 5

| Polyphthalamide (High temperature polyamide) | | |
|---|---|---|
| Formulation | 23 | 24 |
| Polyphthalamide wt % | 57 | 70 |
| Glass wt % | 25 | 30 |
| Inventive FR wt % | 18 | — |
| UL 94 @ 1/32" (0.8 mm) | V-0 | Fail |

Example 8

Polymer compositions containing the flame retardant produced according to Example 4 above in PA 66 were prepared and evaluated for flame retardant activity under UL-94 testing at 0.8 mm thickness. The results are provided in Table 6. Sample 27, which did not contain the inventive flame retardant, failed the UL-94 test.

TABLE 6

| PA 66 | | | |
|---|---|---|---|
| Formulation | 25 | 26 | 27 |
| PA 66 wt % | 45 | 45 | 70 |
| Glass wt % | 30 | 30 | 30 |
| Inventive FR wt % | 25 | 15 | — |
| Melam wt % | — | 10 | — |
| UL 94 @ 1/32" (0.8 mm) | V-2 | V-0 | Fail |

Although particular embodiments of the present invention have been illustrated and described, it will be apparent to those skilled in the art from consideration of the specification and practice of the present disclosure that various modifications and variations can be made without departing from the scope of the invention, as claimed. Thus, it is intended that the specification and examples be considered as exemplary only, with a true scope of the present invention being indicated by the following claims and their equivalents.

What is claimed is:

1. A process for producing a phosphorus-containing flame retardant, comprising preparing a reaction mixture, the reaction mixture comprising (a) an alkyl or aryl substituted phosphonic acid represented by formula (I)

(I)

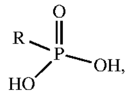

wherein R is $C_{1-12}$ alkyl, $C_{6-10}$ aryl, $C_{7-18}$ alkylaryl, or $C_{7-18}$ arylalkyl, wherein the alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl, (b) a solvent for the phosphonic acid, and (c) a metal which is capable of forming a polycation, or a suitable metal compound which is represented by the formula $$M_p^{(+)y}$$

$X_q$ where M is a metal, (+)y represents the charge of the metal cation, y is 3, X is an anion, and the values for p and q provide a charge balanced metal compound; and heating the reaction mixture containing said components (a), (b), and (c) at a reaction temperature of 140° C. or higher for an amount of time sufficient to produce the phosphorus-containing flame retardant, wherein the molar ratio of component (a) to component (c) in the reaction mixture ranges from 410:1 to 50:1.

2. The process according to claim 1, wherein the reaction mixture is prepared at a preparation temperature below the reaction temperature.

3. The process according to claim 2, wherein the preparation temperature ranges from about 15° C. to about 40° C.

4. The process according to claim 1, wherein the components (a) and (b) of the reaction mixture are in the form of a solution, and preparing the reaction mixture comprises mixing the component (c) with the solution.

5. The process according to claim 1, wherein the reaction temperature is about 150° C. or higher.

6. The process according to claim 1, wherein the reaction temperature ranges from about 140° C. to about 260° C.

7. The process according to claim 1, wherein the solvent is chosen from water, sulfones, sulfoxides, halogenated hydrocarbons, aromatic hydrocarbons, and ethers.

8. The process according to claim 1, wherein the solvent comprises water.

9. The process according to claim 1, wherein component (c) of the reaction mixture comprises a suitable metal compound which is represented by the formula $$M_p^{(+)y}$$

$X_q$.

10. The process according to claim 1, wherein M is chosen from Al, Ga, Sb, Fe, Co, B, and Bi.

11. The process according to claim 10, wherein M is Al or Fe.

12. The process according to claim 1, wherein component (c) of the reaction mixture comprises the suitable metal compound, and the suitable metal compound is chosen from a metal oxide, halide, alkoxide, hydroxide, carbonate, carboxylate, or phosphonate.

13. The process according to claim 12, wherein M in the formula $$M_p^{(+)y}$$

$X_q$ is Al or Fe.

14. The process according to claim 13, wherein the suitable metal compound is chosen from alumina, aluminum trichloride, aluminum trihydroxide, aluminum isopropoxide, aluminum carbonate, aluminum acetate, iron(III) oxide, iron(III) chloride, iron(III) isopropoxide, and iron(III) acetate.

15. The process according to claim 1, wherein R is unsubstituted $C_{1-12}$ alkyl, $C_6$ aryl, $C_{7-10}$ alkylaryl, or $C_{7-10}$ arylalkyl.

16. The process according to claim 15, wherein R is unsubstituted $C_{1-6}$ alkyl.

17. The process according to claim 16, wherein R is methyl, ethyl, propyl, isopropyl, butyl, or t-butyl.

* * * * *